United States Patent
Vaid et al.

(10) Patent No.: US 11,714,872 B2
(45) Date of Patent: Aug. 1, 2023

(54) EFFICIENTLY ACCESSING REFERENCES TO RECENTLY USED RESOURCES

(71) Applicant: MICROSOFT TECHNOLOGY LICENSING, LLC, Redmond, WA (US)

(72) Inventors: Avi Ashish Vaid, Seattle, WA (US); Joseph Jiwoong Oak, Bellevue, WA (US); Mohamed Mansour, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/362,161

(22) Filed: Jun. 29, 2021

(65) Prior Publication Data
US 2022/0414177 A1 Dec. 29, 2022

(51) Int. Cl.
*G06F 17/00* (2019.01)
*G06F 16/955* (2019.01)
*H04L 51/046* (2022.01)

(52) U.S. Cl.
CPC ........ *G06F 16/9558* (2019.01); *H04L 51/046* (2013.01)

(58) Field of Classification Search
CPC ........................... G06F 16/9558; H04L 51/046
See application file for complete search history.

(56) References Cited

U.S. PATENT DOCUMENTS

| 7,974,979 B2 * | 7/2011 | Qiu | G06F 40/274 |
| | | | 707/752 |
| 10,346,882 B2 * | 7/2019 | Flake | G06Q 50/01 |
| 2002/0133633 A1 * | 9/2002 | Kumar | G06F 16/9558 |
| | | | 707/E17.112 |
| 2005/0131992 A1 * | 6/2005 | Goldstein | G06F 3/04817 |
| | | | 707/E17.107 |

(Continued)

FOREIGN PATENT DOCUMENTS

WO 2019119285 A1 6/2019

OTHER PUBLICATIONS

"International Search Report & Written Opinion issued in PCT Application No. PCT/US22/030158", dated Aug. 31, 2022, 12 Pages.

*Primary Examiner* — Laurie A Ries
(74) *Attorney, Agent, or Firm* — Newport IP, LLC; Leonard J. Hope

(57) ABSTRACT

A network service maintains a recently used resource list for a user that includes a list of references (e.g., hyperlinks) to resources (e.g., files) recently accessed by the user. An application, such as a web browser application or a web browser extension, periodically retrieves the recently used resource list for the user from the network service. When the application is utilized to display a text entry field, a user interface ("UI") can be provided for inserting references to recently used resources identified in the recently used resource list into the text entry field. Through the UI, the user can select a resource identified in the recently used resource list using appropriate user input (e.g., selection of a resource using a mouse cursor, touch, or keyboard input). In response thereto, a reference (e.g., a hyperlink) to a selected resource can be inserted into the text entry field.

20 Claims, 11 Drawing Sheets

(56) References Cited

U.S. PATENT DOCUMENTS

| | | | |
|---|---|---|---|
| 2007/0124208 A1* | 5/2007 | Schachter | G06Q 50/01 |
| | | | 705/310 |
| 2009/0112819 A1* | 4/2009 | Williams | G06F 16/3323 |
| 2012/0084294 A1* | 4/2012 | Cho | G06F 16/9558 |
| | | | 707/741 |
| 2013/0205187 A1* | 8/2013 | Hawkins | G06F 16/9558 |
| | | | 715/208 |
| 2014/0380228 A1* | 12/2014 | Shu | G06F 3/0484 |
| | | | 715/780 |
| 2015/0095847 A1* | 4/2015 | Kleinhout | G06F 3/0486 |
| | | | 715/838 |
| 2015/0143211 A1 | 5/2015 | Fairweather | |
| 2016/0098493 A1* | 4/2016 | Primke | G06F 16/951 |
| | | | 707/754 |
| 2017/0177171 A1* | 6/2017 | Won | G06F 3/04883 |
| 2017/0351779 A1* | 12/2017 | Tarasov | G06F 16/9566 |
| 2018/0075136 A1* | 3/2018 | Ko | G06F 16/338 |
| 2019/0140992 A1* | 5/2019 | Badr | G06F 16/5838 |
| 2019/0230090 A1* | 7/2019 | Kathiara | H04L 9/3247 |
| 2020/0097517 A1* | 3/2020 | Labenski | H04L 67/02 |
| 2021/0365849 A1* | 11/2021 | Kamen | G06Q 10/10 |
| 2021/0392096 A1* | 12/2021 | Desserrey | H04L 51/52 |
| 2022/0035519 A1* | 2/2022 | Rathod | H04L 67/02 |
| 2022/0035943 A1* | 2/2022 | Jones | G06F 21/6254 |
| 2022/0215067 A1* | 7/2022 | Shetty | H04L 51/42 |

* cited by examiner

EFFICIENTLY ACCESSING REFERENCES TO RECENTLY USED RESOURCES

BACKGROUND

There are many scenarios in which computer users desire access to references (e.g., hyperlinks or simply "links") to recently used resources, such as recently edited files that are stored on a network. For example, a user might like to compose an email message, or another type of communication, that includes a reference to a document stored on a network that the sending user recently edited. In order to insert such a reference into a communication, the sending user must currently perform multiple time- and resource-consuming operations.

For example, in order to insert a reference to a recently used resource (e.g., a recently edited file) into the body of an email, a computer user currently has to switch away from an email application and back to an application (e.g., a word processing application or web browser application) utilized to open or edit the recently used resource. Once in the application, the user has to then locate the resource for which a reference is to be generated and obtain a sharable reference (e.g., a hyperlink) to the resource. Once the reference has been obtained (e.g., copied to a clipboard), the user must return to the email application and paste the reference to the resource into the draft email.

As can be seen from the example described above, obtaining a reference to a recently used resource currently requires performing a number of steps, which can include a number of context switches between applications. The performance of these steps and their associated context switches can be time consuming and frustrating for users, particularly when they must perform these tasks multiple times per day. Moreover, performance of these operations requires the utilization of computing resources such as, but not limited to, memory and processing cycles.

It is with respect to these and other technical challenges that the disclosure made herein is presented.

SUMMARY

Technologies are disclosed herein for providing quick and efficient access to references to recently used resources. Through implementations of the disclosed technologies, users can quickly locate and insert references to recently used resources in a manner that does not require switching between applications. This can save computing resources, such as memory and processing cycles, as compared to previous solutions such as the one described above. Other technical benefits not specifically mentioned herein can also be realized through implementations of the disclosed subject matter.

In order to realize the technical benefits mentioned briefly above, one or more network services executing in a distributed computing network maintain a recently used resource list for a user in one embodiment. The recently used resource list includes one or more references to resources recently accessed by the user. For example, and without limitation, the recently used resource list might include hyperlinks to files recently accessed by the user through the distributed computing network. The recently used resource list can include other types of references to other types of resources in other embodiments.

In one embodiment, a web browser application, or a web browser extension executing in conjunction with a web browser application, periodically retrieves the recently used resource list for the user from the distributed computing network. For example, and without limitation, a web browser application or a web browser extension might periodically retrieve the recently used resource list for a user using a network services application programming interface ("API") exposed by a network service executing in the distributed computing network.

When the web browser application is utilized to display a web page that includes a text entry field, for instance, a user interface ("UI") can be provided for inserting references to recently used resources from the recently used resource list into the text entry field. For example, and without limitation, in one embodiment a user can provide user input to the text entry field requesting that at least a portion of the recently used resource list be displayed. In one specific example, a user might make a right-click selection within the text entry field in order to have a context menu associated with the text entry field displayed. The context menu displays at least a portion of the recently used resource list in one embodiment.

Once the recently used resource list has been displayed, the user can select a resource identified in the displayed portion of the recently used resource list using appropriate user input (e.g., selection using a mouse cursor, touch, voice, or keyboard input). In response thereto, a reference (e.g., the hyperlink) to the selected resource can be inserted into the text entry field.

In another embodiment, a user can type a text command into a text entry field in order to have at least a portion of the recently used resource list displayed. For example, and without limitation, a user might type a text command comprising a predefined character (e.g., a forward slash) followed by one or more other predefined characters (e.g., "office" or "recent") into a text entry field. In response thereto, the web browser or web browser extension might display at least a portion of the recently used resource list. In one embodiment, additional characters typed following the predefined characters (i.e., the text command) can be utilized to filter the displayed portion of the recently used resource list.

As in the example above, once the recently used resource list has been displayed, the user can select a resource identified in the displayed portion of the recently used resource list using appropriate user input. In response thereto, the reference (e.g., the hyperlink) to the selected resource can be inserted into the text entry field. The recently used resource list can be displayed in conjunction with other types of UI fields in response to other types of user input in other embodiments.

It is to be appreciated that while some of the embodiments disclosed herein are presented in the context of providing access to references to recently used resources through a web browser application, the embodiments disclosed herein are not limited to such an implementation. Rather, the embodiments disclosed herein can be utilized with other types of applications, such as productivity applications including word processing applications, spreadsheet applications, presentation applications, communication applications (e.g., email or group chat applications), personal information management ("PIM") applications, messaging, communication, and collaboration applications such as SLACK or MICROSOFT TEAMS, note-taking applications, and other types of office and personal productivity software applications.

In this regard, it is to be further appreciated that while some embodiments disclosed herein provide access to references to recently used files, the embodiments disclosed herein are not limited to such an implementation. Rather, the embodiments disclosed herein can be utilized to provide access to references to other types of recently used resources including, but not limited to, email addresses, contacts, calendar events, web browser history entries, clipboard contents, to-do list entries, and other types of resources, some of which will be described below.

As discussed briefly above, implementations of the technologies disclosed herein enable users to quickly access and utilize references to recently utilized resources, which can save computing resources such as memory and processing cycles. Other technical benefits not specifically identified herein can also be realized through implementations of the disclosed technologies.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
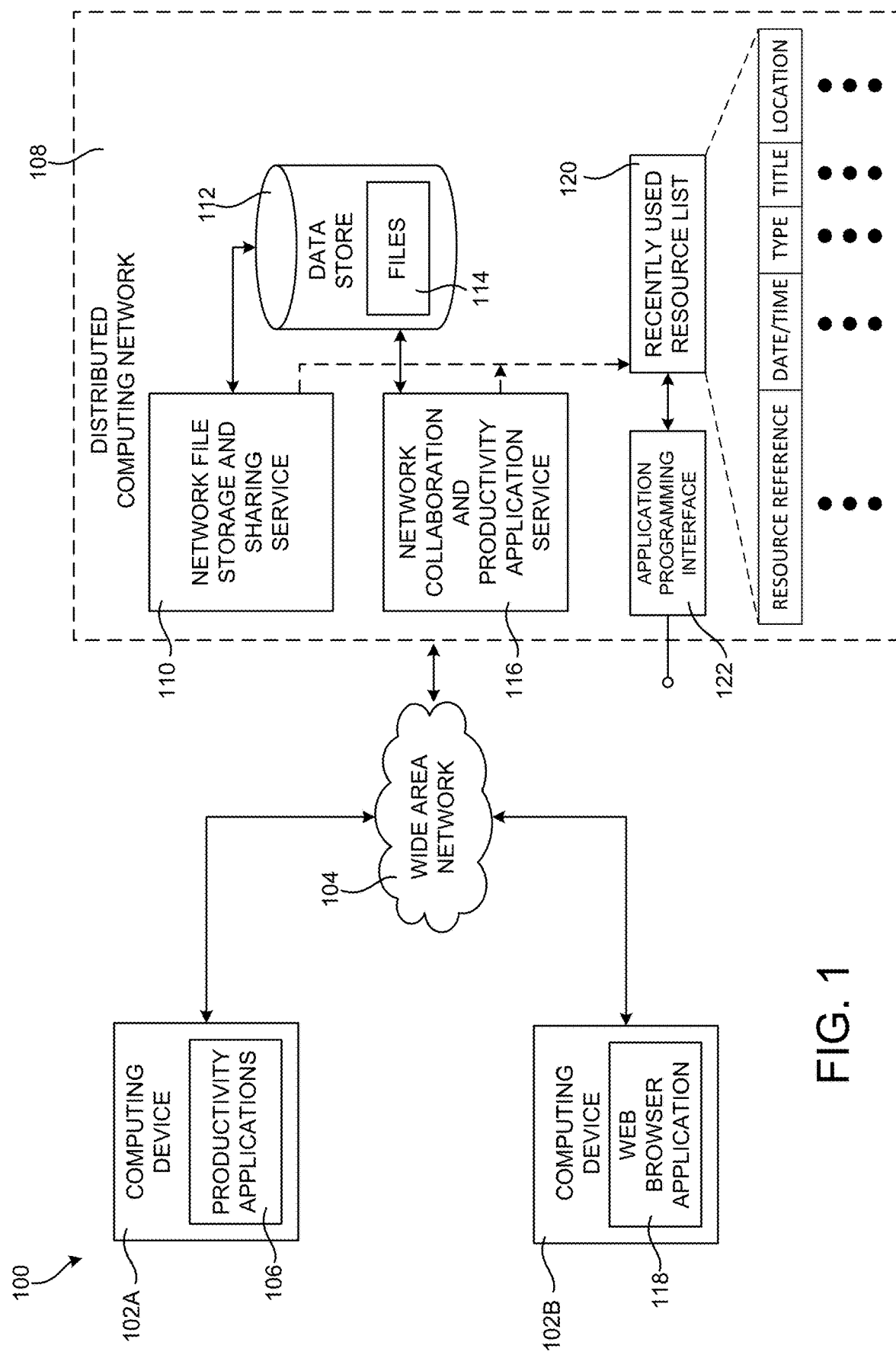
FIG. 1 is a network architecture diagram that shows aspects of an illustrative operating environment for the embodiments disclosed herein that includes a distributed computing network.

The following detailed description is directed to technologies for providing quick and efficient access to references to recently used resources. As discussed briefly above, through implementations of the disclosed technologies, users can quickly locate and insert references to recently used resources in a manner that does not require switching between applications. This can save computing resources, such as memory and processing cycles, as compared to previous solutions such as that described above. Other technical benefits not specifically mentioned herein can also be realized through implementations of the disclosed subject matter.

While the subject matter described herein is presented in the general context of a computing device configured to provide efficient access to references to recently used resources, those skilled in the art will recognize that other implementations can be performed in combination with other types of computing systems and modules. Those skilled in the art will also appreciate that the subject matter described herein can be practiced with other computer system configurations, including hand-held devices, multiprocessor systems, microprocessor-based or programmable consumer electronics, computing or processing systems embedded in devices (such as wearable computing devices, automobiles, home automation etc.), minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several FIGS., aspects of various technologies for providing quick and efficient access to references to recently used resources will be described.

FIG. 1 is a network architecture diagram that shows aspects of an illustrative operating environment 100 for the embodiments disclosed herein. The illustrative operating environment 100 shown in FIG. 1 includes a number of computing devices 102A and 102B. The computing devices 102A and 102B (which may be referred to collectively as the "computing devices 102") might be, for example, desktop or laptop computers, mobile devices, tablet computing devices, or other types of computing devices capable of connecting to a wide area network ("WAN") 104, such as the Internet and providing the functionality disclosed herein.

The computing devices 102 are configured in embodiments to execute various types of software applications. For instance, the computing device 102A might be configured to execute productivity applications 106. The productivity applications 106 may include, but are not limited to, word processing applications, spreadsheet applications, presentation applications, communication applications (e.g., email or group chat applications), PIM applications, note-taking applications, messaging, communication, and collaboration applications such as SLACK or MICROSOFT TEAMS, and other types of office and personal productivity software applications.

Specific examples of such productivity applications 106 include, but are not limited to, the MICROSOFT 365 suite of productivity applications from MICROSOFT CORP., the OPEN OFFICE productivity suite from APACHE, and WORDPERFECT OFFICE from COREL. The technologies disclosed herein might also be utilized with other individual productivity applications and suites of productivity applications and other types of applications altogether.

According to various embodiments disclosed herein, the productivity applications 106 are configured to enable the opening and saving of files utilizing remote network services. For example, in one embodiment a network-accessible distributed computing network 108 can provide a network file storage and sharing service 110 to the computing devices 102 by way of the WAN 104. The network file storage and sharing service 110 maintains or has access to a data store 112 for storing files 114. The files 114 can include, but are not limited to, word processing files, spreadsheet files, database files, image files, presentation files, audio and video files, and other types of files.

The productivity applications 106 can store, retrieve, modify, and perform other functions on the files 114 stored in the data store 112. Examples of the network file storage and sharing service 110 include, but are not limited to the ONEDRIVE file storage system from MICROSOFT CORP., the DROPBOX file storage system from DROPBOX, INC., and the AMAZON CLOUD DRIVE file storage system from AMAZON, INC. Other types of file storage and sharing services from other vendors might also be utilized with the embodiments presented herein.

The distributed computing network 108 might also be configured with a network collaboration and productivity application service 116. The network collaboration and productivity application service 116 is a network service, or services, that can provide functionality for allowing the computing devices 102 to access world wide web ("web")-based versions of the productivity applications 106 through a web browser application 118.

For example, and without limitation, the network collaboration and productivity application service 116 can provide access to web-based word processing applications, spreadsheet applications, presentation applications, communication applications (e.g., email and group chat applications), PIM applications, note-taking applications, and other types of office and personal productivity software applications that provide functionality that is the same or similar to that provided by the productivity applications 106.

The web-based applications provided by the network collaboration and productivity application service 116 can also store, retrieve, modify, and perform other functions on the files 114 stored in the data store 112. Examples of the network collaboration and productivity application service 116 include, but are not limited to, GOOGLE WORKSPACE from GOOGLE, INC. and MICROSOFT 365 from MICROSOFT CORP. Other types of web-based network collaboration and productivity application services from other vendors might also be utilized in other embodiments.

The distributed computing network 108 also provides functionality for enabling users to access files 114 in the data store 112 utilizing appropriate network references to the files 114, such as hyperlinks. For instance, and without limitation, a user might utilize the web browser application 118 to specify a link corresponding to a file 114 stored in the data store 112.

In response thereto, the network collaboration and productivity application service 116 (or the network file storage and sharing service 110) may request the identified file 114 from the data store 112 utilizing an appropriate network protocol. The requested file 114 may then be retrieved from the data store 112 and presented by the web browser application 118 for viewing and/or editing using an appropriate web application provided by the network collaboration and productivity application service 116. The productivity applications 106 executing on the computing device 102A can also retrieve and store files 114 utilizing an appropriate reference to the files 114 in a similar fashion.

As shown in FIG. 1, the distributed computing network 108 also provides functionality in some embodiments for maintaining a per user recently used resource list 120. The recently used resource list 120 provides data that identifies a number of resources that were last accessed by a user of the distributed computing network 108. The recently used resource list 120 might, for example, include data identifying the last ten files 114 accessed by a user of the distributed computing network 108. The recently used resources can be resources that the user accessed using the productivity applications 106, the web applications provided by the network collaboration and productivity application service 116, or in another manner.

It is to be appreciated that the embodiments disclosed herein are not limited to maintaining and presenting only the recently used resources. For example, and without limitation, in some embodiments, the recently used resource list 120 might identify the most commonly, or frequently, used resources over some recent time period even if the resources were not among the X most recently used resources. In order to accomplish this, a weighting might be assigned to resources based on the number of times they were used. Resources having a high weighting might be included in the recently used resources list 120 even though they are not in the X most recently used resources.

The network file storage and sharing service 110 and the network collaboration and productivity application service 116 are configured to update the recently used resource list 120 in some embodiments. For example, and without limitation, the network file storage and sharing service 110 might add an entry to the recently used resource list 120 identifying a hyperlink to a file 114 in response to the file 114 being accessed, opened, read, edited, modified, saved, copied, or moved by one of the productivity applications 106 or another component executing on the computing device 102A. Another network service, or services, can update the recently used resource list 120 in response to the occurrence of other operations being performed on a resource in a similar fashion in other embodiments.

As mentioned above, it is to be appreciated that while the disclosure presented herein is primarily made in the context of recently used files 114, the recently used resource list 120 and the UIs presented herein can include data identifying other types of resources accessed or utilized by a user of a computing device 102. For example, and without limitation, the recently used resource list 120 can include email addresses, contacts, calendar events, web browser history entries, clipboard contents, to-do list entries, and other types of objects or resources.

In this regard, it is to be further appreciated that while the recently used resource list 120 is described herein as including a hyperlink for a recently used resource, other types of references that can be utilized to retrieve a resource identified in the recently used resource list 120 can be specified in other embodiments. Additionally, and as shown in FIG. 1, the recently used resource list 120 might include other data, such as the date and time at which a resource was created and/or last used, the type of resource that was used (e.g., a word processing document, a spreadsheet document), a title of the resource, and/or a location at which the resource is stored. Other types of data and metadata might also be stored in the recently used resource list 120 in other embodiments.

It is also to be appreciated that while the embodiments disclosed herein are primarily presented in the context of using a predefined character (e.g., a forward slash) followed by one or more other predefined characters (e.g., "office" or "recent") into a text entry field to obtain a recently used resource list 120, the technologies disclosed herein can be utilized to initiate other types of commands when a predefined character followed by one or more other characters are typed into a text box presented by a web browser or another type of application. For example, and without limitation, the command "/office <keyword>" when typed into a text box might suggest documents having filenames or content matching the keyword. As another example, the command "/contacts <keyword>" when typed into a text box might display a list of contacts having attributes matching the keyword. Similar commands can be utilized in a text box to locate images (e.g., GIFs, documents, addresses, and other types of content). Additionally, third party applications might be permitted to register to implement other types of functionality for locating other types of content in a similar fashion.

As also shown in FIG. 1, in some embodiments the distributed computing network 108 can execute a network service (not shown in FIG. 1) that exposes a network services application programming interface ("API") 122 through which calling components can retrieve the recently used resource list 120 associated with a particular user of the distributed computing network 108. As will be described in greater detail below, the web browser application 118, the productivity applications 106, and potentially other applications, can utilize the API 122 to obtain the recently used resource list 120 for a particular user and to provide UIs for quickly and efficiently accessing references to recently used resources. Details regarding this functionality is provided below with regard to FIGS. 2A-7.

Before concluding the discussion of FIG. 1, it is to be appreciated that the network services and computing devices 102 shown in this FIG. are merely illustrative and that many other types and numbers of network services and computing devices might be utilized in the embodiments disclosed herein. It should also be appreciated that while the embodiments disclosed herein are primarily presented in the context of productivity applications 106 executing on a computing device 102 or provided by a network service 116 as shown in FIG. 1, the embodiments utilized herein might be implemented with any type of application that provides for the utilization of files 114 or other resources. Additionally, it should be appreciated that the network services and computing devices shown in FIG. 1 have been greatly simplified for discussion purposes only. Additional details regarding the configuration and operation of some of these components will be provided below.

Figure 2A:
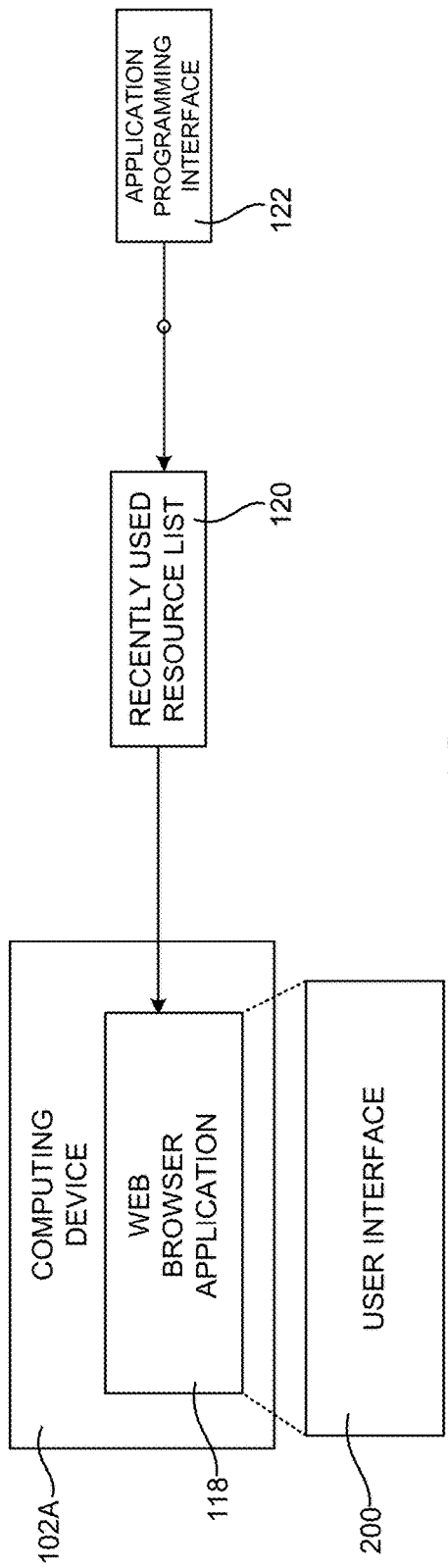
FIG. 2A is a network architecture diagram that shows aspects of the operation of a web browser application in one embodiment disclosed herein.

FIG. 2A is a network architecture diagram that shows additional aspects of the operation of the web browser application 118 in one embodiment disclosed herein. As discussed briefly above, in one embodiment the web browser application 118 executes on a computing device 102A and periodically retrieves the recently used resource list 120 for a user from the distributed computing network 108.

In order to retrieve the recently used resource list 120 for a user, the web browser application 118 can also provide functionality for enabling a user to authenticate with the distributed computing network 108 in order to utilize the functionality of the network services executing therein. For example, the web browser application 118 might receive a username and password for the user and utilize these credentials to authenticate the user with the distributed computing network 108.

Once the user has been authenticated with the distributed computing network 108, the web browser application 118 can periodically retrieve the recently used resource list 120 for the user using the network services API 122 exposed by a network service executing in the distributed computing network 108. A background worker or script is utilized in some embodiments to periodically retrieve and cache the recently used resource list 120. The recently used resource list 108 can be retrieved from other network locations in other ways in other embodiments.

Figure 2B:
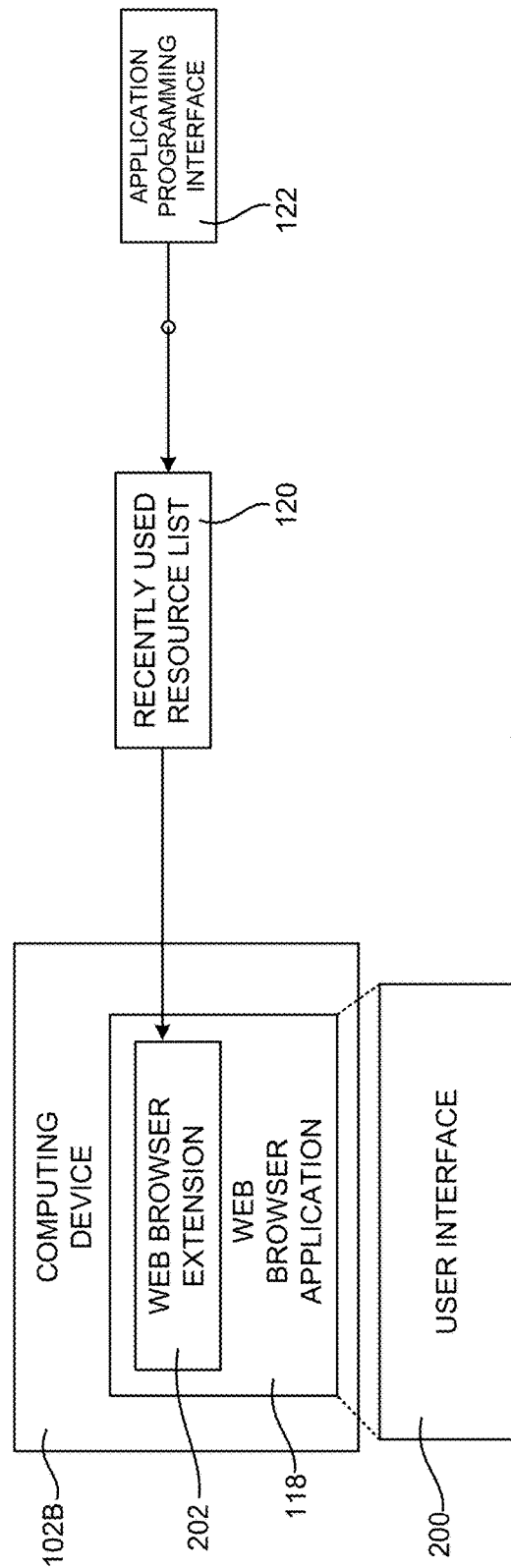
FIG. 2B is a network architecture diagram that shows aspects of the operation of a web browser extension in another embodiment disclosed herein.

In another embodiment, illustrated in FIG. 2B, a web browser extension 202 executes in conjunction with the web browser application 118. In this embodiment, the web browser extension 202 provides the functionality for enabling a user to authenticate with the distributed computing network 108 in order to utilize the functionality of the network services executing therein. For example, the web browser extension 202 might receive a username and password for the user and utilize these credentials to authenticate the user with the distributed computing network 108.

Once the user has been authenticated with the distributed computing network 108, the web browser extension 202 can periodically retrieve the recently used resource list 120 for the user using the network services API 122 exposed by a network service executing in the distributed computing network 108. The recently used resource list 108 can be retrieved from other network locations in other ways in other embodiments.

As will be described in greater detail below, when the web browser application 118 is utilized to display a web page that includes a text entry field, for instance, the web browser application 118 or the web browser extension 202 can provide a UI 200 for inserting references to recently used resources in the recently used resource list 120 into the text entry field. For example, and without limitation, in one embodiment a user can provide user input to the text entry field requesting that at least a portion of the recently used resource list 120 be displayed. Once the recently used resource list 120 has been displayed, the user can select a resource identified in the displayed portion of the recently used resource list 120 using appropriate user input (e.g., selection using a mouse cursor, touch, or keyboard input). In response thereto, a reference (e.g., a hyperlink) to the selected resource can be inserted into the text entry field.

It is to be appreciated that the term text entry field as used herein encompasses user interface fields for entering text that have a specifically defined area, such as those presented by a web browser and illustrated in the FIGS., and other types of user interfaces for entering text, such as free-form user interfaces for entering text such as a canvas presented by a word processing application for creating and editing documents. As such, it is to be further appreciated that the embodiments disclosed herein can be utilized with any user interface element where text, such as a reference to a resource, can be entered.

In one specific example, a user might make a selection (e.g., a right-click selection using a mouse or touch input) within a text entry field in order to have a context menu associated with the text entry field displayed. The context menu displays at least a portion of the recently used resource list 120 in one embodiment. Details regarding this embodiment are provided below with regard to FIGS. 3A-3C.

In another embodiment, a user can type a predefined command into a text entry field in order to have at least a portion of the recently used resource list 120 displayed. In response thereto, the web browser application 118 or web browser extension 202 might display at least a portion of the recently used resource list 120. Once the recently used resource list 120 has been displayed, the user can select a resource identified in the displayed portion of the recently used resource list using appropriate user input. In response thereto, the reference (e.g., a hyperlink) to the selected resource can be inserted into the text entry field. Details regarding this embodiment are provided below with regard to FIGS. 4A-4C.

Figure 3A:
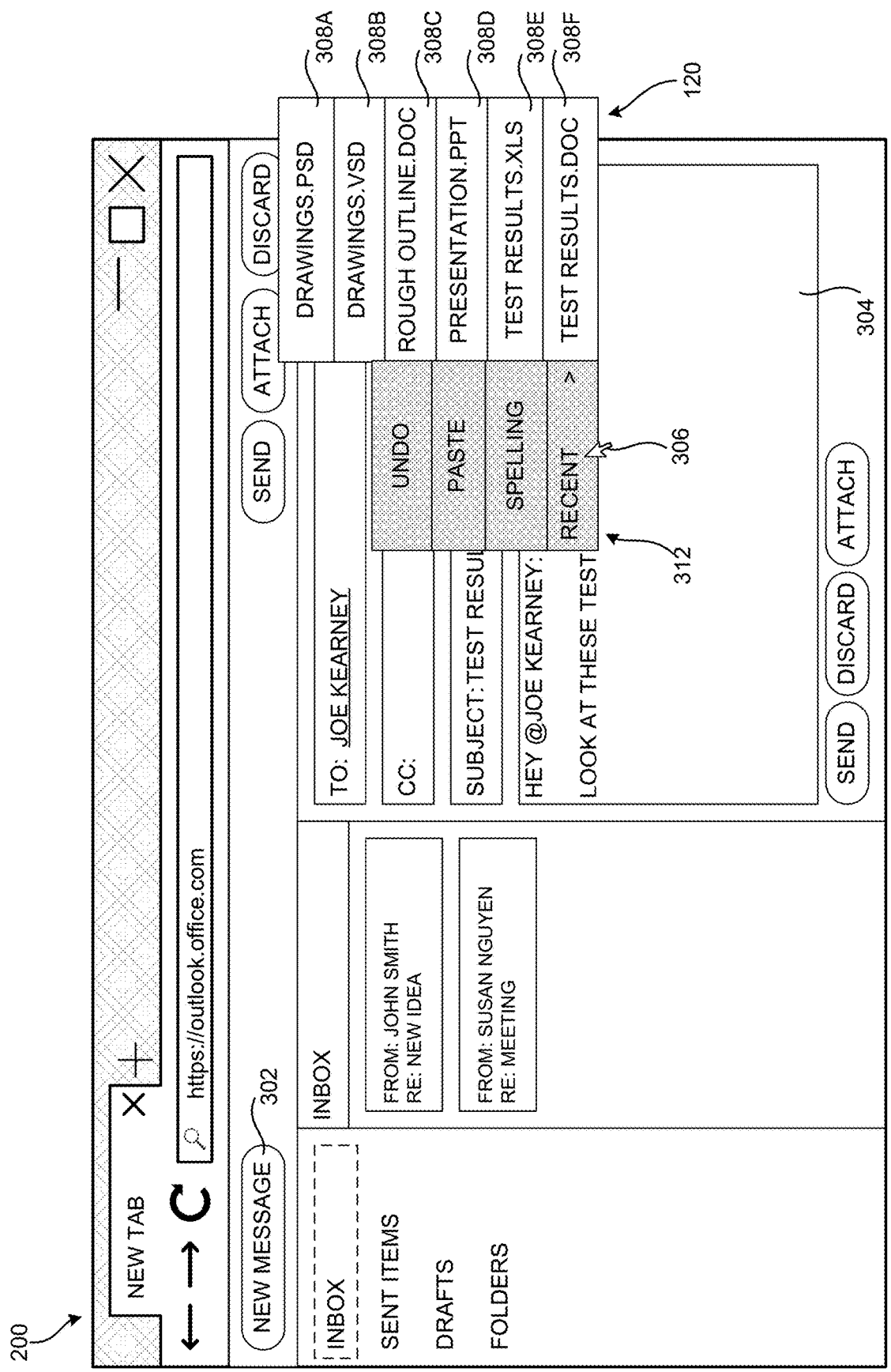
FIG. 3A is a user interface diagram showing aspects of an illustrative user interface for providing quick and efficient access to references to recently used resources, according to one embodiment disclosed herein.

FIG. 3A is a user interface diagram showing aspects of an illustrative UI 200 for providing quick and efficient access to references to recently used resources, according to one embodiment disclosed herein. In the illustrated example, the web browser application 118 has been utilized to access a web-based email application provided by the network collaboration and productivity application service 116 operating in the distributed computing network 108. As illustrated, the web-based email application provides conventional email-related functionality such as, for example, displaying a list of email folders (e.g., inbox, sent items, and drafts) and for displaying an email inbox with received email messages.

The web-based email application also provides functionality for composing new messages. In order to access this functionality, a user has selected the UI control 302 in the illustrated example. In response thereto, the web-based email application has displayed the fields for a new email message (e.g., to, cc, subject), along with a text entry field 304 for entering the body text of the new email message. In the illustrated example, the user has typed an email address for a recipient, a subject, and email body text.

In the illustrated example, the user has also provided user input to the text entry field 304 requesting that at least a portion of the recently used resource list 120 be displayed. In the illustrated example, for instance, the user has placed a mouse cursor 306 in the text entry field 304 and made a right-click selection within the text entry field 304 in order to have a context menu 308 associated with the text entry field 304 displayed. A user can request that the context menu 308 be displayed using other types of user input in other embodiments (e.g., keyboard commands or touch input).

As shown, selection of one of the entries in the context menu 312 (i.e., the entry labeled 'recent' in the illustrated example) will cause at least a portion of the previously retrieved and cached recently used resource list 120 to be displayed. In the illustrated example, the recently used resource list 120 includes entries corresponding to six recently used resources 308A-308F, files in this case. If more resources exist in the recently used resource list 120 than can be displayed in the available space, appropriate user interface controls (e.g., scroll bars) can be provided to enable a user to access the remainder of the resources in the recently used resource list 120.

The number of entries displayed in the recently used resource list 120 can be selected based upon one or more of a number of factors including, but not limited to, the available space on-screen for displaying the recently used resource list 120 or user preference. The particular entries displayed in the recently used resource list 120 can be the X most recently used resources or might be selected in another manner. For example, and without limitation, the body text of an email message might be examined in order to determine which resources to present in the recently used resource list 120. As a particular example, an email message might include text indicating that "the spreadsheet for Q3 is attached." In this example, only recently used spreadsheet files might be presented in the recently used resource list 120. The number and particular resources shown in the recently used resources list 120 can be selected in other ways in other embodiments.

Figure 3B:
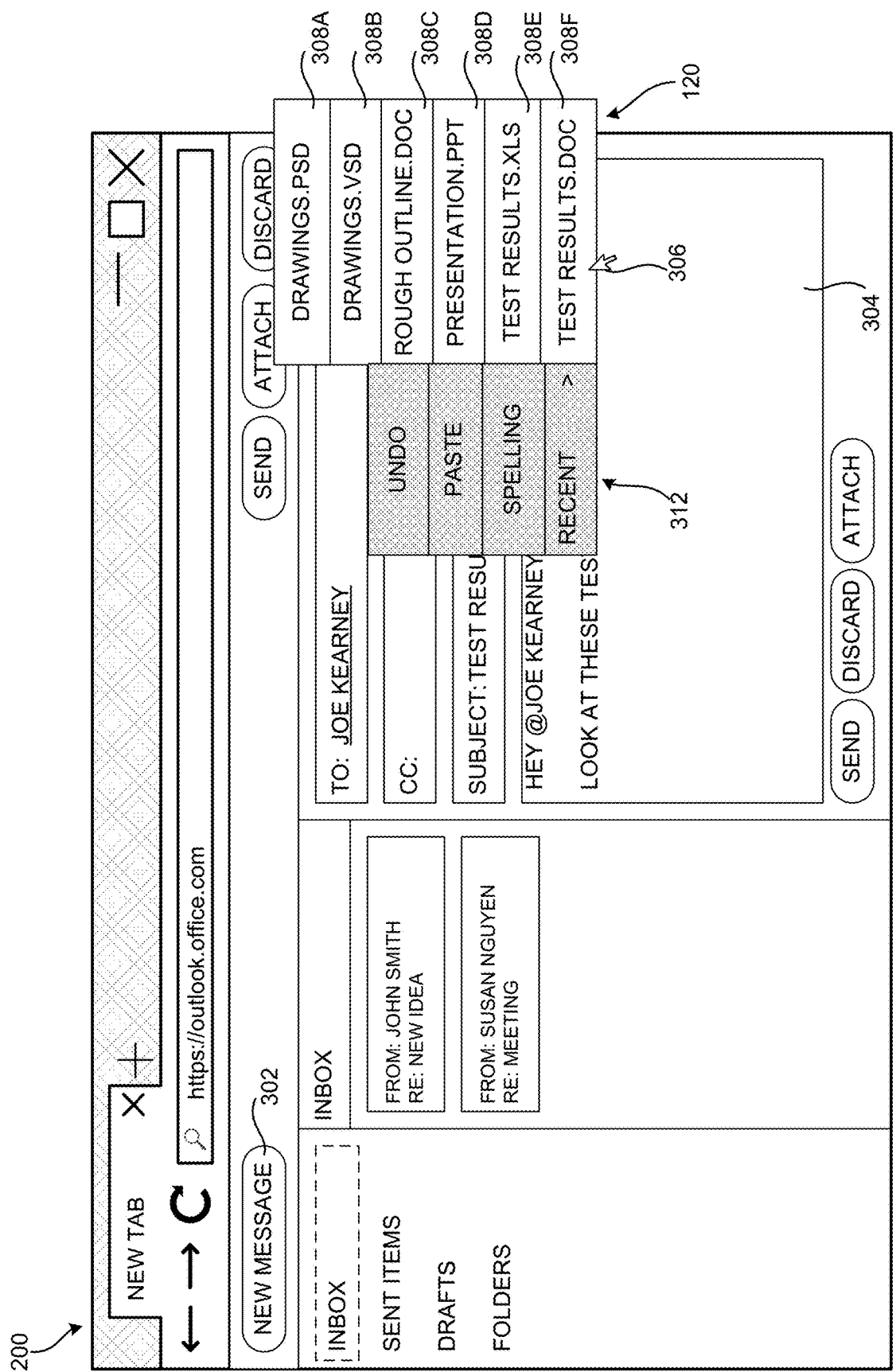
FIG. 3B is a user interface diagram showing additional aspects of the illustrative user interface shown in FIG. 3A for providing quick and efficient access to references to recently used resources, according to one embodiment disclosed herein.

As shown in FIG. 3B, once the recently used resource list 120 has been displayed, a user can select a resource 308 identified in the displayed portion of the recently used resource list 120 using appropriate user input (e.g., selection using a mouse cursor, touch, or keyboard input). In response thereto, a reference (e.g., a hyperlink) to the selected resource 308 can be inserted into the text entry field 304. This is illustrated in FIG. 3C.

It is to be appreciated that the reference to a selected resource 308 can be displayed in a variety of ways in various embodiments. For example, and without limitation, text might be replaced with the inserted reference. In the example shown in FIG. 3C, for instance, the text "test results" might be replaced with a hyperlink entitled "test results.doc" or simply "test results." In some examples, an icon or other type of graphical indicator might also be inserted that identifies the application utilized to create or that will be utilized to open the referenced resource.

In the illustrated example, the user has selected the resource 308F using the mouse cursor 306. In response thereto, a reference 310 (e.g., a hyperlink) to the selected resource 308F has been inserted into the text entry field. The user can then select the UI control 314 using the mouse cursor 306 in order to have the composed message sent. When the receiving user selects the reference 310 in the body text of the email message, they will be provided access to the corresponding resource 308F.

Figure 3C:
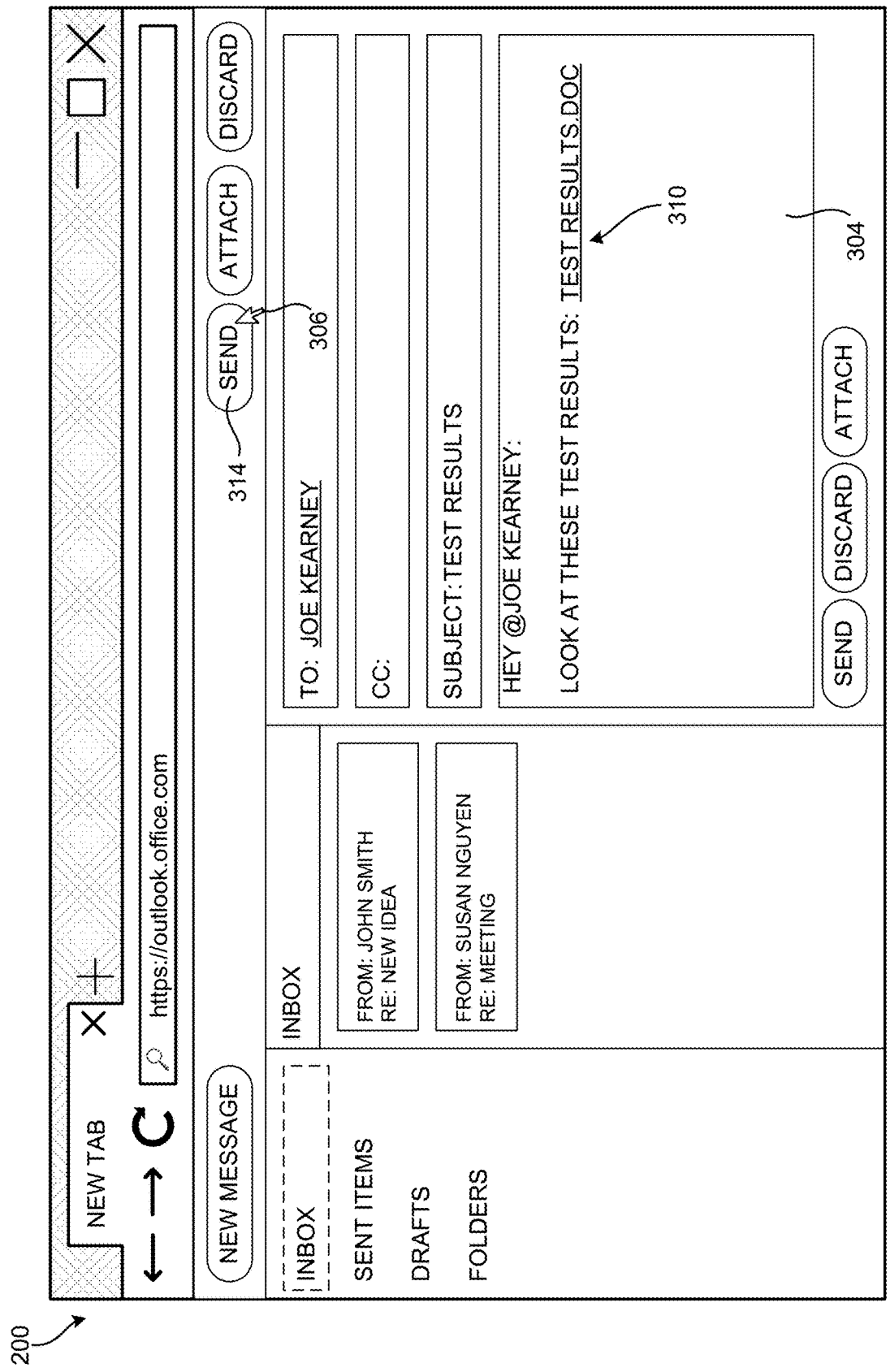
FIG. 3C is a user interface diagram showing additional aspects of the illustrative user interface shown in FIGS. 3A and 3B for providing quick and efficient access to references to recently used resources, according to one embodiment disclosed herein.

It is to be appreciated that while the embodiment shown in FIG. 3A-3C utilizes a context menu 312 to access the recently used resource list 120, the recently used resource list 120 can be accessed independently of the context menu 312 in other embodiments. For example, and without limitation, a right-click action or a right-click action while holding a predefined keyboard key might cause the recently used resource list 120 to be displayed independently of the context menu 312.

When the embodiment shown in FIGS. 3A-3C is implemented in conjunction with a web browser application 118 that utilizes the CHROMIUM codebase, an extension API can be utilized to inject the recently used resource list 120 into the context menu 308. Other mechanisms can be utilized to present the recently used resource list 120 in browsers based upon other technologies.

Figure 4A:
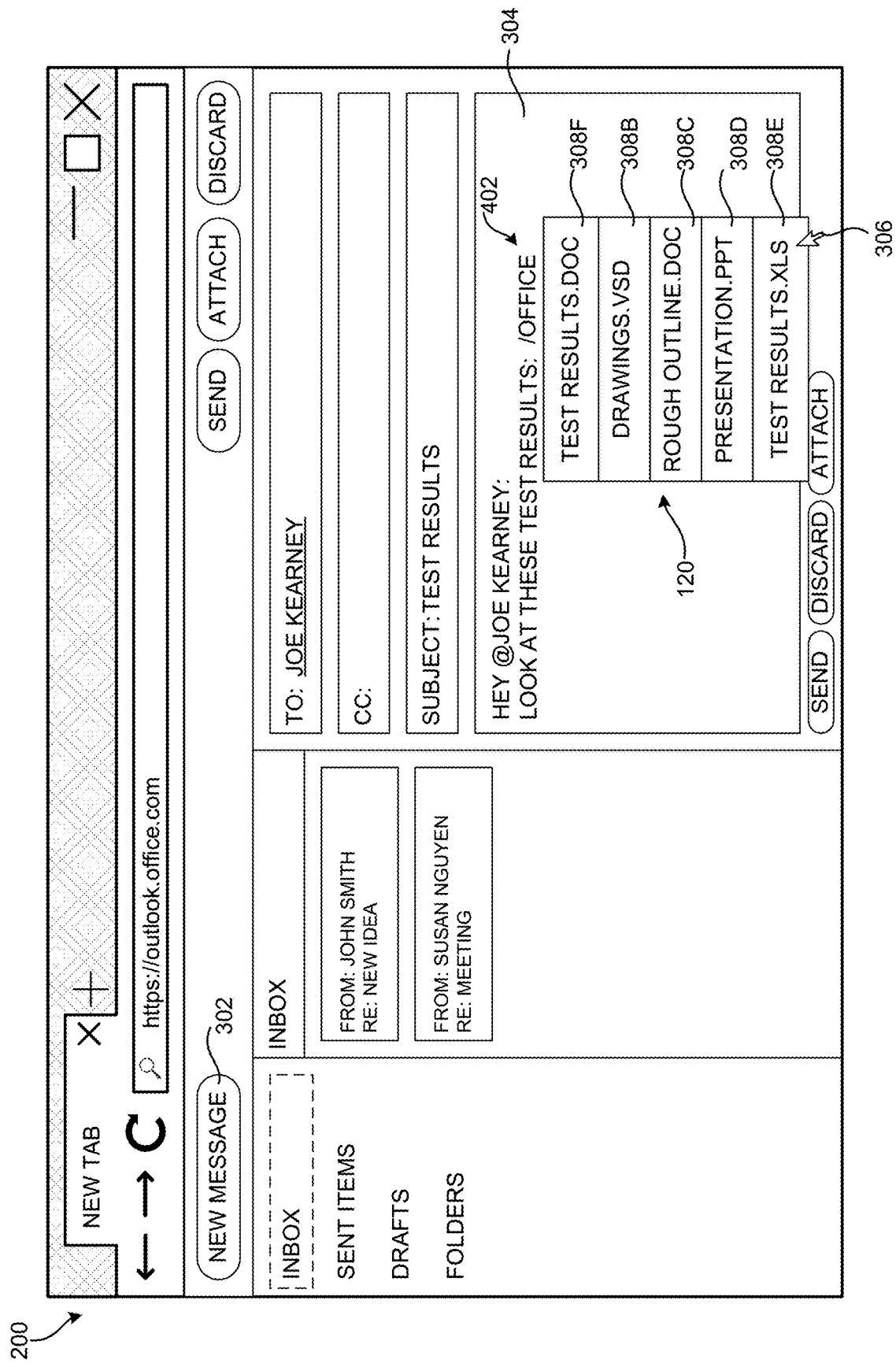
FIG. 4A is a user interface diagram showing aspects of another illustrative user interface for providing quick and efficient access to references to recently used resources, according to one embodiment disclosed herein.

FIG. 4A is a user interface diagram showing aspects of another illustrative UI 200 for providing quick and efficient access to references to recently used resources, according to one embodiment disclosed herein. In this embodiment, a user can type a command 402 (i.e., a predefined character or a sequence of predefined characters) into the text entry field 304 in order to have at least a portion of the previously retrieved and cached recently used resource list 120 displayed. For example, and without limitation, a user might type a predefined character (e.g., a forward slash) followed by one or more other predefined characters (e.g., "office" or "recent") into the text entry field 304. In response thereto, the web browser application 118 or the web browser extension 202 might display at least a portion of the recently used resource list 120.

In the example shown in FIG. 4A, for instance, a user has typed the predefined character "/" followed by the characters "office" in the text entry field 304 to form a command 402, which might be referred to as a "slash command." The command "/office" 402 indicates to the web browser application 118 or the web browser extension 202 that the recently used resource list 120 is to be displayed.

Accordingly, in response thereto, the web browser application 118 or the web browser extension 202 has displayed the recently used resource list 120. In this example, the list 120 includes entries corresponding to five recently used resources 308, files in this case. If more resources exist in the recently used resource list 120 than can be displayed in the available space, appropriate user interface controls (e.g., scroll bars) can be provided to enable a user to access the remainder of the resources in the recently used resource list 120.

In one embodiment, additional characters typed following the command 402 can be utilized to filter the displayed portion of the recently used resource list 120. In the example shown in FIG. 4B, for instance, the user has typed the additional characters "TE." Accordingly, the recently used resource list 120 has been filtered to show only those recently used resources that include matching characters in their names. As a result, only two resources 308F and 308E are shown in the recently used resource list 120 in the example shown in FIG. 4B.

As in the example above, once the recently used resource list 120 has been displayed, the user can select a resource identified in the displayed portion of the recently used resource list 120 using appropriate user input. In the example shown in FIG. 4B, for instance, the user has selected the resource 308F using the mouse cursor 306. Other types of user input can be utilized to make a selection from the recently used resource list 120.

In the illustrated example, the user has selected the resource 308F using the mouse cursor 306. In response thereto, and as illustrated in FIG. 4C, a reference 310 (e.g., a hyperlink) to the selected resource 308F has been inserted into the text entry field. The user can then select the UI control 314 using the mouse cursor 306 (or another type of user input) in order to have the composed message sent. When the receiving user selects the reference 310 in the body text of the email message, they will be provided access to the corresponding resource 308F.

Figure 4B:
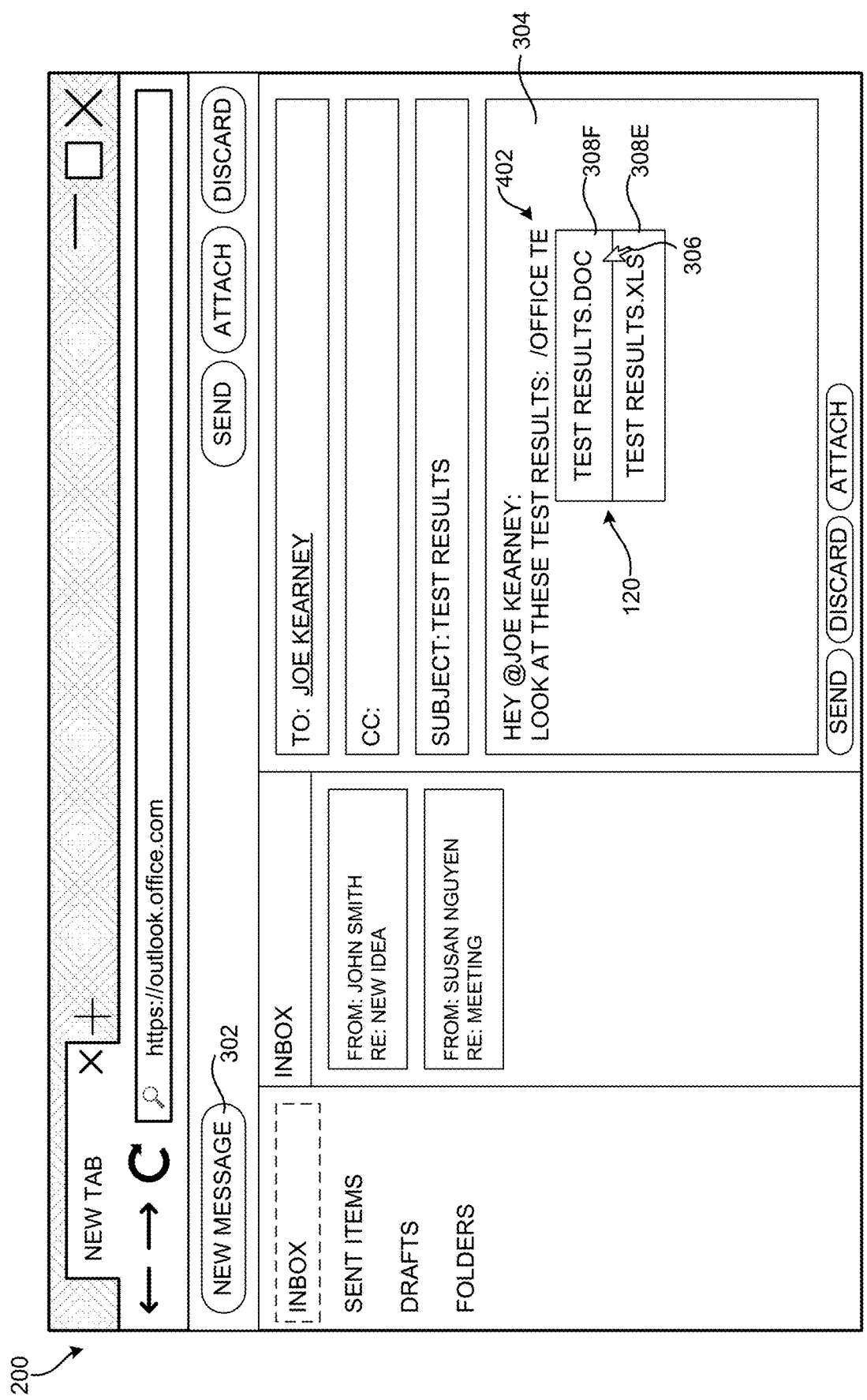
FIG. 4B is a user interface diagram showing additional aspects of the illustrative user interface shown in FIG. 4A for providing quick and efficient access to references to recently used resources, according to one embodiment disclosed herein.
Figure 4C:
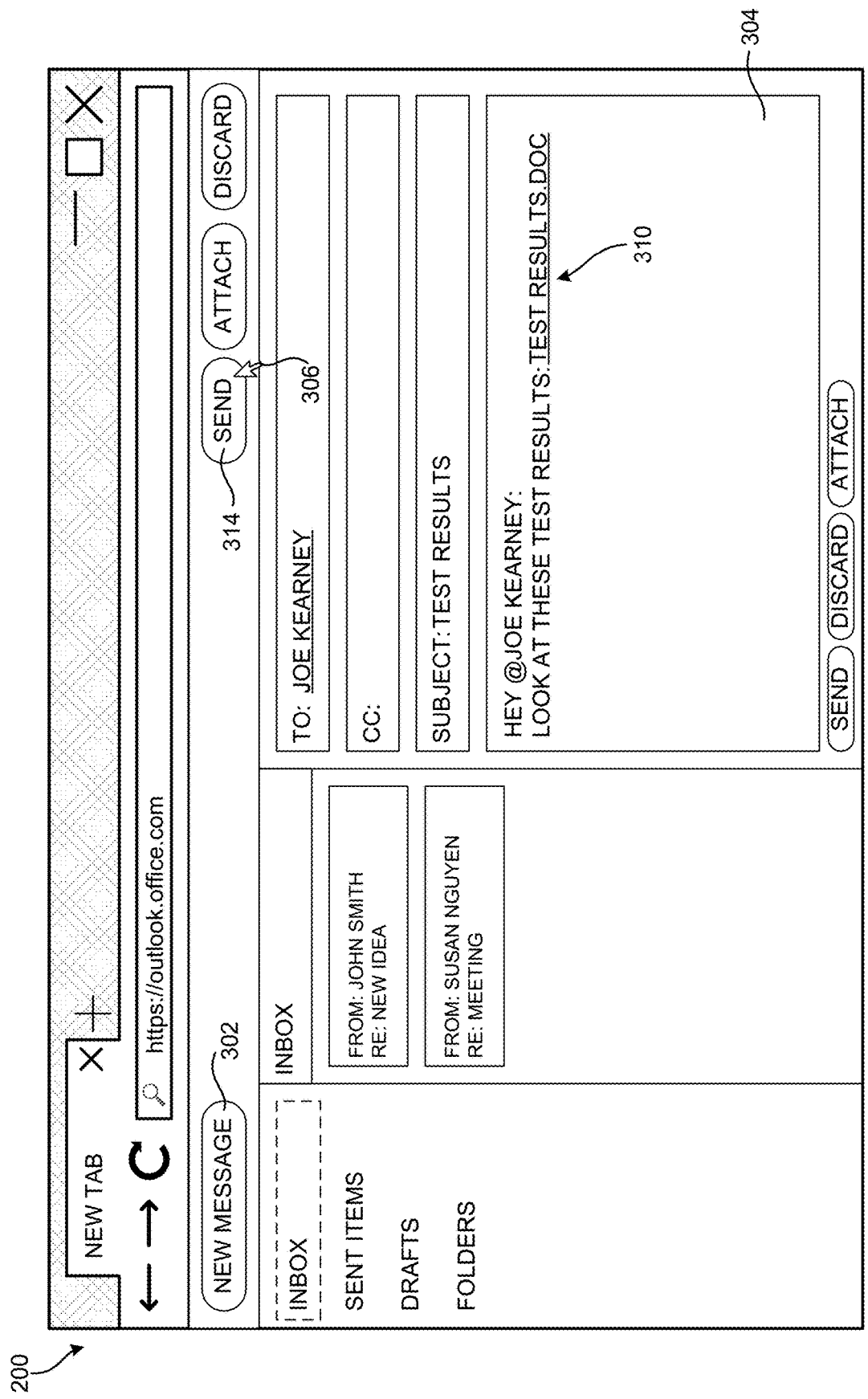
FIG. 4C is a user interface diagram showing additional aspects of the illustrative user interface shown in FIGS. 4A and 4B for providing quick and efficient access to references to recently used resources, according to one embodiment disclosed herein.

When the embodiment shown in FIGS. 4A-4C is implemented in conjunction with a web browser application 118 that utilizes the CHROMIUM codebase, content scripts can be utilized to listen for slash commands and to render the recently used resource list 120 in response to detecting input of a slash command. Other mechanisms can be utilized to detect and process slash commands or other predefined character commands in order to present the recently used resource list 120 in browsers based upon other technologies.

As discussed briefly above, it is to be appreciated that while the examples described with reference to FIGS. 3A-4C have been presented in the context of a web browser application 118, the technologies disclosed herein can be utilized to provide access to references to recently used resources in other types of applications.

Figure 5:
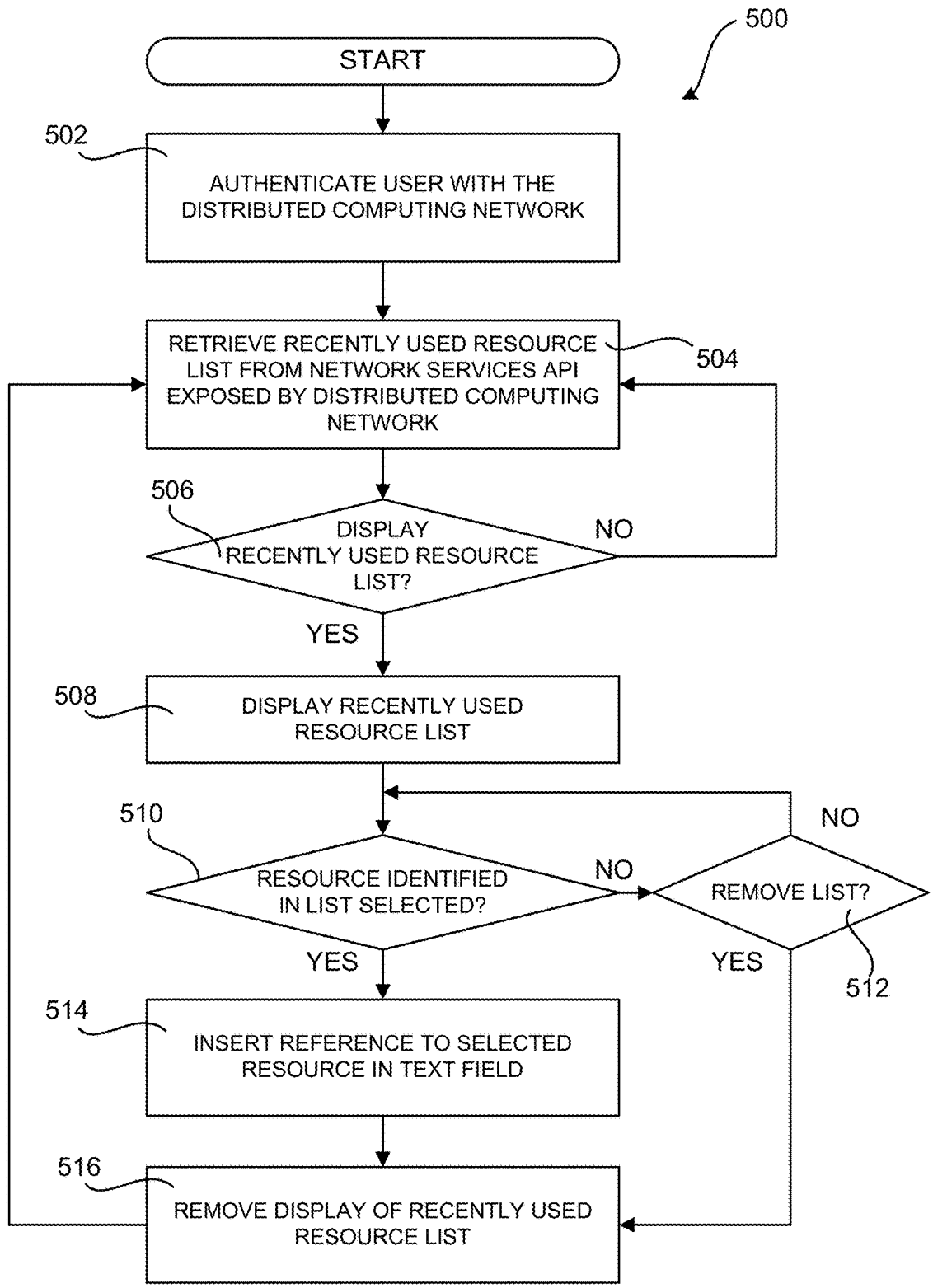
FIG. 5 is a flow diagram showing a routine that illustrates aspects of the operation of the mechanism described with reference to FIGS. 1-4C for providing quick and efficient access to references to recently used resources, according to one embodiment disclosed herein.

FIG. 5 is a flow diagram showing a routine 500 that illustrates aspects of the operation of the mechanism described with reference to FIGS. 1-4C for providing quick and efficient access to references to recently used resources, according to one embodiment disclosed herein. It should be appreciated that the logical operations described herein with regard to FIG. 5, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 500 begins at operation 502, where the web browser application 118 or the web browser extension 202 authenticates a user with the distributed computing network 108. Once the user has been authenticated, the routine 500 proceeds to operation 504, where the web browser application 118 or the web browser extension 202 retrieves the recently used resource list 120 for the user from the network services API 122 exposed by the distributed computing network 108. The routine 500 then proceeds from operation 504 to operation 506.

At operation 506, the web browser application 118 or the web browser extension 202 determines whether the recently used resource list 120 is to be displayed. As discussed above, a user might provide various types of user input in order to request that the recently used resource list 120 be displayed. For example, a user might make a right-click selection (or another type of selection) in a text entry field 304 or type a command 402 (e.g., "/office" or "/recent") in the text entry field 304. Other types of user input, such as a voice command, can trigger the display of the recently used resource list 120 in conjunction with a text entry field.

If the recently used resource list 120 is to be displayed, the routine 500 proceeds from operation 506 to operation 508, where the web browser application 118 or the web browser extension 202 displays the recently used resource list 120 in the manner described above. The routine 500 then proceeds from operation 508 to operation 510, where a determination is made as to whether a resource identified in the displayed recently used resource list 120 has been selected.

If a resource has not been selected, the routine 500 proceeds to operation 512, where a determination is made as to whether the display of the recently used resource list 120 should be removed. For instance, if a user provides user input outside the list 120, the display of the list 120 may be removed. If the display of the list 120 is to be removed, the routine 500 proceeds from operation 512 to operation 516. If the list 120 is not to be removed, the routine 500 proceeds from operation 512 back to operation 510.

If, at operation 510, it is determined that a resource in the recently used resource list 120 has been selected, the routine 500 proceeds from operation 510 to operation 514, where a reference (e.g., a hyperlink) to the selected resource is inserted into the text entry field. As discussed above, in embodiments where the CHROMIUM codebase is utilized, such as in the MICROSOFT EDGE web browser and the GOOGLE CHROME web browser, content scripts, extension APIs, or other types of APIs can be utilized to insert the reference into the text entry field. Other types of APIs or system extensions can be utilized to insert the reference in other embodiments.

The routine 500 then proceeds from operation 514 to operation 516, where the display of the recently used resource list 120 is returned. The routine 500 then proceeds back to operation 504, where another request to insert a reference to a recently used resource might be processed in a similar manner.

Figure 6:
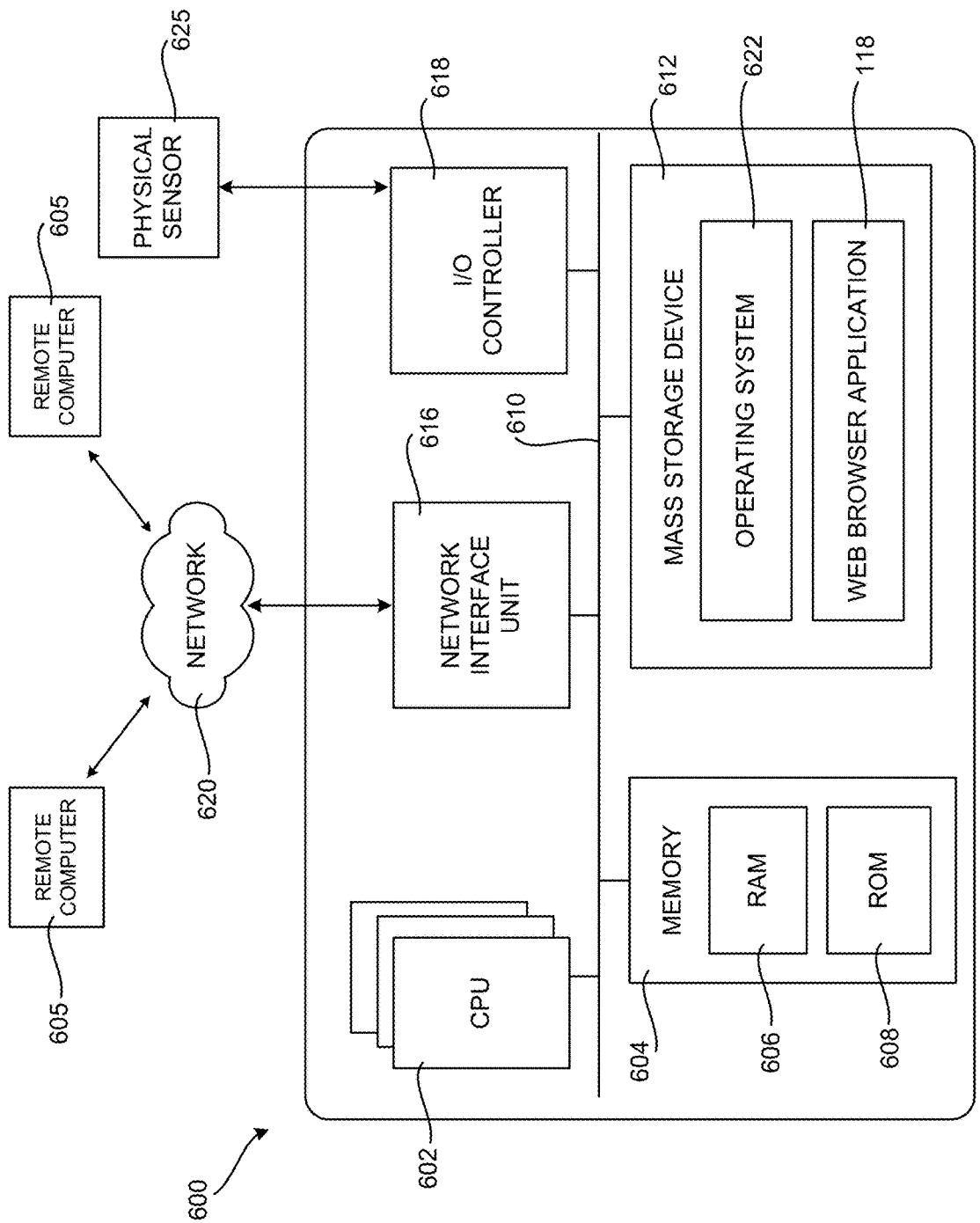
FIG. 6 is a computer architecture diagram showing an illustrative computer hardware and software architecture for a computing device that can implement aspects of the technologies presented herein.

FIG. 6 is a computer architecture diagram showing an illustrative computer hardware and software architecture for a computing device that can implement the various technologies presented herein. In particular, the architecture illustrated in FIG. 6 can be utilized to implement a server computer, mobile phone, an e-reader, a smartphone, a desktop computer, an AR/VR device, a tablet computer, a laptop computer, or another type of computing device, such as the computing devices 102 or computing devices in the distributed computing network 108.

The computer 600 illustrated in FIG. 6 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system ("BIOS" or "firmware") containing the basic routines that help to transfer information between elements within the computer 600, such as during startup, can be stored in the ROM 608. The computer 600 further includes a mass storage device 612 for storing an operating system 622, application programs, such as the web browser application 118, and other types of programs. The mass storage device 612 can also be configured to store other types of programs and data.

The mass storage device 612 is connected to the CPU 602 through a mass storage controller (not shown) connected to the bus 610. The mass storage device 612 and its associated computer readable media provide non-volatile storage for the computer 600. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 600. For purposes of the claims, the phrase "computer storage medium," and variations thereof, does not include waves or signals per se or communication media.

According to various configurations, the computer 600 can operate in a networked environment using logical connections to remote computers through a network such as the network 620. The computer 600 can connect to the network 620 through a network interface unit 616 connected to the bus 610. It should be appreciated that the network interface unit 616 can also be utilized to connect to other types of networks and remote computer systems. The computer 600 can also include an input/output controller 618 for receiving and processing input from a number of other devices, including a keyboard, mouse, touch input, an electronic stylus (not shown in FIG. 6), or a physical sensor such as a video camera. Similarly, the input/output controller 618 can provide output to a display screen or other type of output device (also not shown in FIG. 6).

It should be appreciated that the software components described herein, when loaded into the CPU 602 and executed, can transform the CPU 602 and the overall computer 600 from a general-purpose computing device into a special-purpose computing device customized to facilitate the functionality presented herein. The CPU 602 can be constructed from any number of transistors or other discrete circuit elements, which can individually or collectively assume any number of states. More specifically, the CPU 602 can operate as a finite-state machine, in response to executable instructions contained within the software modules disclosed herein. These computer-executable instructions can transform the CPU 602 by specifying how the CPU 602 transitions between states, thereby transforming the transistors or other discrete hardware elements constituting the CPU 602.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 600 in order to store and execute the software components presented herein. It also should be appreciated that the architecture shown in FIG. 6 for the computer 600, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 600 might not include all of the components shown in FIG. 6, can include other components that are not explicitly shown in FIG. 6, or can utilize an architecture completely different than that shown in FIG. 6.

Figure 7:
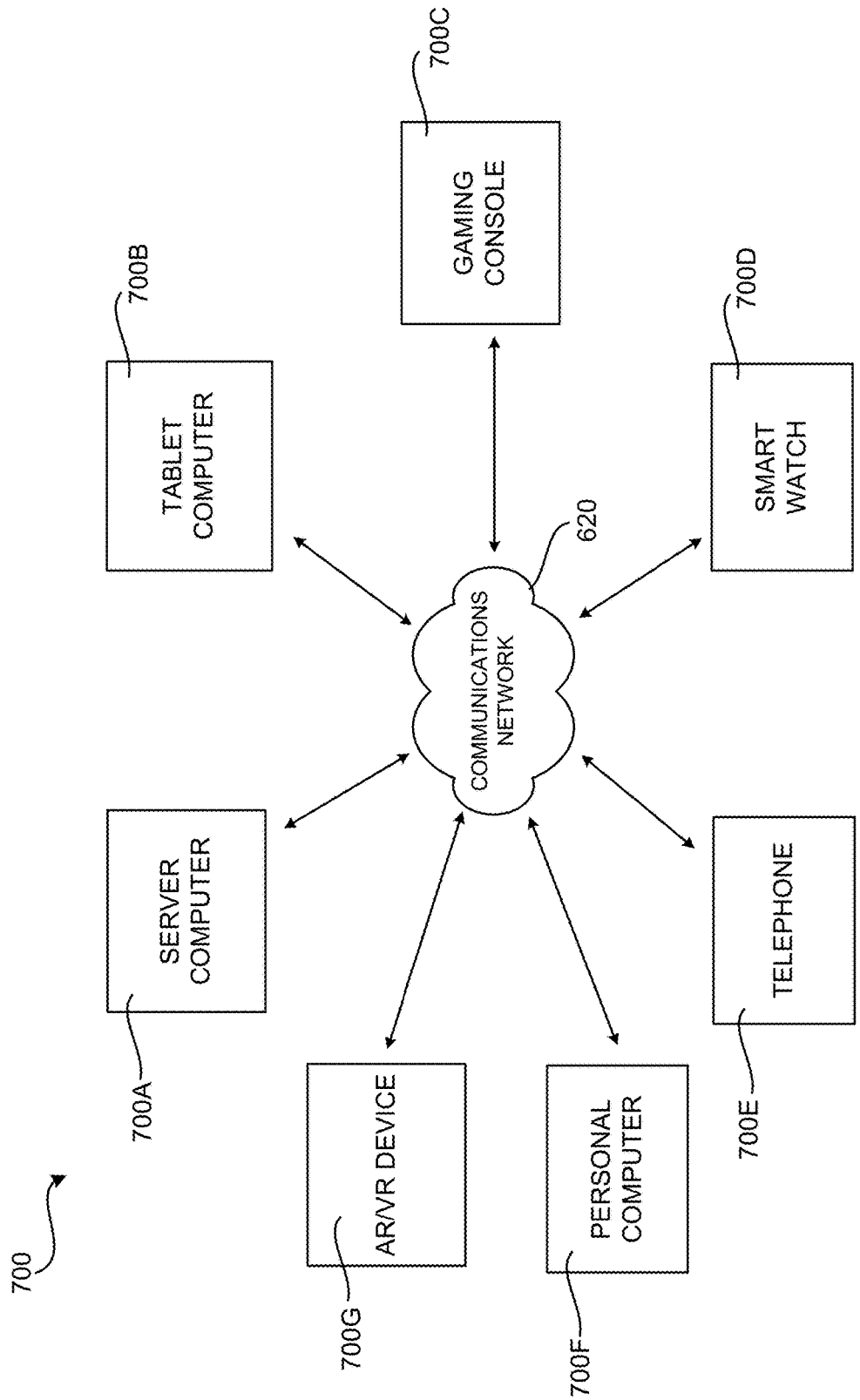
FIG. 7 is a network diagram illustrating a distributed computing environment in which aspects of the disclosed technologies can be implemented.

FIG. 7 is a network diagram illustrating a distributed network computing environment 700 in which aspects of the disclosed technologies can be implemented, according to various embodiments presented herein. As shown in FIG. 7, one or more server computers 700A can be interconnected via a communications network 620 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of computing devices such as, but not limited to, a tablet computer 700B, a gaming console 700C, a smart watch 700D, a telephone 700E, such as a smartphone, a personal computer 700F, and an AR/VR device 700G.

In a network environment in which the communications network 620 is the Internet, for example, the server computer 700A can be a dedicated server computer operable to process and communicate data to and from the computing devices 700B-700G via any of a number of known protocols, such as, hypertext transfer protocol ("HTTP"), file transfer protocol ("FTP"), or simple object access protocol ("SOAP"). Additionally, the networked computing environment 700 can utilize various data security protocols such as secured socket layer ("SSL") or pretty good privacy ("PGP"). Each of the computing devices 700B-700G can be equipped with an operating system operable to support one or more computing applications or terminal sessions such as a web browser (not shown in FIG. 7), or other graphical user interface (not shown in FIG. 7), or a mobile desktop environment (not shown in FIG. 7) to gain access to the server computer 700A.

The server computer 700A can be communicatively coupled to other computing environments (not shown in FIG. 7) and receive data regarding a participating user's interactions/resource network. In an illustrative operation, a user (not shown in FIG. 7) may interact with a computing application running on a computing device 700B-700G to obtain desired data and/or perform other computing applications.

The data and/or computing applications may be stored on the server 700A, or servers 700A, and communicated to cooperating users through the computing devices 700B-700G over an exemplary communications network 620. A participating user (not shown in FIG. 7) may request access to specific data and applications housed in whole or in part on the server computer 700A. These data may be communicated between the computing devices 700B-700G and the server computer 700A for processing and storage.

The server computer 700A can host computing applications, processes and applets for the generation, authentication, encryption, and communication of data and applications, and may cooperate with other server computing environments (not shown in FIG. 7), third party service providers (not shown in FIG. 7), network attached storage ("NAS") and storage area networks ("SAN") to realize application/data transactions.

It should be appreciated that the computing architecture shown in FIG. 6 and the distributed network computing environment shown in FIG. 7 have been simplified for ease of discussion. It should also be appreciated that the computing architecture and the distributed computing network can include and utilize many more computing components, devices, software programs, networking devices, and other components not specifically described herein.

The disclosure presented herein also encompasses the subject matter set forth in the following clauses:

Clause 1. A computer-implemented method for providing access to a reference to a recently used resource, the method comprising: retrieving a recently used resource list from a network location, the recently used resource list comprising one or more references to resources recently accessed by a user; displaying, by way of a web browser application, a web page comprising a text entry field; receiving a request to display at least a portion of the recently used resource list, the request received by way of user input made to the text entry field; and responsive to receiving the request, displaying at least a portion of the recently used resource list, receiving a selection of a resource identified in the displayed portion of the recently used resource list, and inserting a reference to the selected resource in the text entry field.

Clause 2. The computer-implemented method of clause 1, wherein the resources comprise files recently accessed by the user and wherein the references comprise hyperlinks to the files.

Clause 3. The computer-implemented method of any of clauses 1 or 2, wherein the request comprises user input requesting the display of a context menu associated with the text entry field and wherein the portion of the recently used resource list is displayed in the context menu.

Clause 4. The computer-implemented method of any of clauses 1-3, wherein the request comprises an entry of one or more predefined characters in the text entry field.

Clause 5. The computer-implemented method of any of clauses 1-4, wherein the method further comprises: receiving one or more additional characters in the text entry field following the one or more predefined characters; and filtering the displayed portion of the recently used resource list based on the received one or more additional characters.

Clause 6. The computer-implemented method of any of clauses 1-5, wherein retrieving the recently used resource list from the network location comprises retrieving the recently used resource list from a network services application programming interface (API) exposed by a distributed computing network.

Clause 7. The computer-implemented method of any of clauses 1-6, wherein the web browser application retrieves the recently used resource list from the network services API.

Clause 8. The computer-implemented method of any of clauses 1-7, wherein a web browser extension retrieves the recently used resource list from the network services API.

Clause 9. A computer-readable storage medium having computer-executable instructions stored thereupon which, when executed by a computer, cause the computer to: retrieve a recently used resource list comprising one or more references to resources recently accessed by a user; display a text entry field; receive a request to display at least a portion of the recently used resource list, the request received by way of user input made to the text entry field; and responsive to receiving the request, display at least a portion of the recently used resource list, receive a selection of a resource identified in the displayed portion of the recently used resource list, and insert a reference to the selected resource in the text entry field.

Clause 10. The computer-readable storage medium of clause 9, wherein the resources comprise files recently accessed by the user and wherein the references comprise hyperlinks to the files.

Clause 11. The computer-readable storage medium of any of clauses 9 or 10, wherein the request comprises user input requesting the display of a context menu associated with the text entry field and wherein the portion of the recently used resource list is displayed in the context menu.

Clause 12. The computer-readable storage medium of any of clauses 9-11, wherein retrieving the recently used resource list comprises retrieving the recently used resource list from a network services application programming interface (API).

Clause 13. The computer-readable storage medium of any of clauses 9-12, wherein the request comprises an entry of one or more predefined characters in the text entry field.

Clause 14. The computer-readable storage medium of any of clauses 9-13, wherein the computer-readable storage medium has further computer-executable instructions stored thereupon which, when executed by a computer, cause the computer to: receive one or more additional characters in the text entry field following the one or more predefined characters; and filter the displayed portion of the recently used resource list based on the received one or more additional characters.

Clause 15. A computing device, comprising: at least one processor; and a computer-readable storage medium having computer-executable instructions stored thereupon which, when executed by the at least one processor, cause the computing device to: retrieve a recently used resource list comprising one or more references to resources recently accessed by a user; display a text entry field; receive a request to display at least a portion of the recently used resource list, the request received by way of user input made to the text entry field; and responsive to receiving the request, display at least a portion of the recently used resource list, receive a selection of a resource identified in the displayed portion of the recently used resource list, and insert a reference to the selected resource in the text entry field.

Clause 16. The computing device of clause 15, wherein the resources comprise files recently accessed by the user and wherein the references comprise hyperlinks to the files.

Clause 17. The computing device of any of clauses 15 or 16, wherein the request comprises user input requesting the display of a context menu associated with the text entry field and wherein the portion of the recently used resource list is displayed in the context menu.

Clause 18. The computing device of any of clauses 15-17, wherein retrieving the recently used resource list comprises retrieving the recently used resource list from a network services application programming interface (API).

Clause 19. The computing device of any of clauses 15-18, wherein the request comprises an entry of one or more predefined characters in the text entry field.

Clause 20. The computing device of any of clauses 15-19, wherein the computer-readable storage medium has further computer-executable instructions stored thereupon which, when executed by the at least one processor, cause the computing device to: receive one or more additional characters in the text entry field following the one or more predefined characters; and filter the displayed portion of the recently used resource list based on the received one or more additional characters.

Based on the foregoing, it should be appreciated that technologies for providing quick and efficient access to references to recently used resources have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method for providing access to a reference to a recently used resource, the method comprising:
    retrieving a recently used resource list from a network location, the recently used resource list comprising one or more references to resources recently accessed by a user;
    displaying, by way of a web browser application, a web page comprising a text entry field;
    receiving a request to display at least a portion of the recently used resource list, the request received by way of user input made to the text entry field; and
    responsive to receiving the request,
        displaying at least a portion of the recently used resource list,
        receiving a selection of a resource identified in the displayed portion of the recently used resource list, and
        inserting a reference to the selected resource in the text entry field.

2. The computer-implemented method of claim 1, wherein the resources comprise files recently accessed by the user and wherein the references comprise hyperlinks to the files.

3. The computer-implemented method of claim 1, wherein the request comprises user input requesting the display of a context menu associated with the text entry field and wherein the portion of the recently used resource list is displayed in the context menu.

4. The computer-implemented method of claim 1, wherein the request comprises an entry of one or more predefined characters in the text entry field.

5. The computer-implemented method of claim 4, wherein the method further comprises:
receiving one or more additional characters in the text entry field following the one or more predefined characters; and
filtering the displayed portion of the recently used resource list based on the received one or more additional characters.

6. The computer-implemented method of claim 1, wherein retrieving the recently used resource list from the network location comprises retrieving the recently used resource list from a network services application programming interface (API) exposed by a distributed computing network.

7. The computer-implemented method of claim 6, wherein the web browser application retrieves the recently used resource list from the network services API.

8. The computer-implemented method of claim 6, wherein a web browser extension retrieves the recently used resource list from the network services API.

9. A computer-readable storage medium having computer-executable instructions stored thereupon which, when executed by a computer, cause the computer to:
retrieve a recently used resource list comprising one or more references to resources recently accessed by a user;
display a text entry field;
receive a request to display at least a portion of the recently used resource list, the request received by way of user input made to the text entry field; and
responsive to receiving the request,
display at least a portion of the recently used resource list,
receive a selection of a resource identified in the displayed portion of the recently used resource list, and
insert a reference to the selected resource in the text entry field.

10. The computer-readable storage medium of claim 9, wherein the resources comprise files recently accessed by the user and wherein the references comprise hyperlinks to the files.

11. The computer-readable storage medium of claim 9, wherein the request comprises user input requesting the display of a context menu associated with the text entry field and wherein the portion of the recently used resource list is displayed in the context menu.

12. The computer-readable storage medium of claim 9, wherein retrieving the recently used resource list comprises retrieving the recently used resource list from a network services application programming interface (API).

13. The computer-readable storage medium of claim 9, wherein the request comprises an entry of one or more predefined characters in the text entry field.

14. The computer-readable storage medium of claim 13, wherein the computer-readable storage medium has further computer-executable instructions stored thereupon which, when executed by a computer, cause the computer to:
receive one or more additional characters in the text entry field following the one or more predefined characters; and
filter the displayed portion of the recently used resource list based on the received one or more additional characters.

15. A computing device, comprising:
at least one processor; and
a computer-readable storage medium having computer-executable instructions stored thereupon which, when executed by the at least one processor, cause the computing device to:
retrieve a recently used resource list comprising one or more references to resources recently accessed by a user;
display a text entry field;
receive a request to display at least a portion of the recently used resource list, the request received by way of user input made to the text entry field; and
responsive to receiving the request,
display at least a portion of the recently used resource list,
receive a selection of a resource identified in the displayed portion of the recently used resource list, and
insert a reference to the selected resource in the text entry field.

16. The computing device of claim 15, wherein the resources comprise files recently accessed by the user and wherein the references comprise hyperlinks to the files.

17. The computing device of claim 15, wherein the request comprises user input requesting the display of a context menu associated with the text entry field and wherein the portion of the recently used resource list is displayed in the context menu.

18. The computing device of claim 15, wherein retrieving the recently used resource list comprises retrieving the recently used resource list from a network services application programming interface (API).

19. The computing device of claim 15, wherein the request comprises an entry of one or more predefined characters in the text entry field.

20. The computing device of claim 19, wherein the computer-readable storage medium has further computer-executable instructions stored thereupon which, when executed by the at least one processor, cause the computing device to:
receive one or more additional characters in the text entry field following the one or more predefined characters; and
filter the displayed portion of the recently used resource list based on the received one or more additional characters.

* * * * *